United States Patent
Sun et al.

(10) Patent No.: US 12,021,630 B2
(45) Date of Patent: Jun. 25, 2024

(54) METHODS, WIRELESS DEVICE AND NETWORK NODE FOR TRANSMISSION OF UPLINK DATA

(71) Applicant: Telefonaktiebolaget LM Ericsson (publ), Stockholm (SE)

(72) Inventors: Ying Sun, Täby (SE); Xuejun Yang, Järfälla (SE); Jianwei Zhang, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 479 days.

(21) Appl. No.: 17/289,245

(22) PCT Filed: Nov. 5, 2018

(86) PCT No.: PCT/SE2018/051124
§ 371 (c)(1),
(2) Date: Apr. 28, 2021

(87) PCT Pub. No.: WO2020/096500
PCT Pub. Date: May 14, 2020

(65) Prior Publication Data
US 2021/0399837 A1 Dec. 23, 2021

(51) Int. Cl.
*H04L 1/1812* (2023.01)
*H04L 1/1822* (2023.01)
*H04W 72/23* (2023.01)

(52) U.S. Cl.
CPC .......... *H04L 1/1812* (2013.01); *H04L 1/1822* (2013.01); *H04W 72/23* (2023.01)

(58) Field of Classification Search
CPC ..... H04L 1/1812; H04L 1/1822; H04W 72/23
See application file for complete search history.

(56) References Cited

U.S. PATENT DOCUMENTS

| 2018/0176945 A1 | 6/2018 | Cao et al. |
| 2018/0310333 A1 | 10/2018 | Akkarakaran et al. |

FOREIGN PATENT DOCUMENTS

| WO | 2016183449 A2 | 11/2016 |
| WO | 2017172447 A1 | 10/2017 |

OTHER PUBLICATIONS

Examination Report, IN App. No. 202117017100, dated Feb. 16, 2022, 5 pages.

(Continued)

*Primary Examiner* — Natasha W Cosme
(74) *Attorney, Agent, or Firm* — Nicholson De Vos Webster & Elliott LLP

(57) ABSTRACT

A method performed by a wireless device for wireless transmission of data to a network node of a wireless communication network. The method comprises receiving, from the network node, at a first time slot, a first scheduling grant instructing the wireless device to transmit first data to the network node at a third time slot, and receiving, from the network node, at a second time slot later than the first time slot but earlier than the third time slot, a second scheduling grant instructing the wireless device to transmit second data to the network node at the third time slot. The method further comprises transmitting, to the network node at the third time slot, the second data, and possibly also the first data, in uplink transmission resources of the third time slot, wherein the transmission is performed in accordance with an instruction.

16 Claims, 7 Drawing Sheets

(56) References Cited

OTHER PUBLICATIONS

International Preliminary Report on Patentability, PCT App. No. PCT/SE2018/051124, dated May 20, 2021, 10 pages.
International Search Report and Written Opinion for Application No. PCT/SE2018/051124, dated Jun. 12, 2019, 13 pages.
CATT, "Multiplexing of UL transmissions of different reliability requirements," Apr. 16-20, 2018, 7 pages, 3GPP TSG RAN WG1 Meeting #92bis, R1-1803768, Sanya, China.
Communication pursuant to Article 94(3) EPC, EP App. No. 18803793.1, dated Feb. 27, 2023, 8 pages.

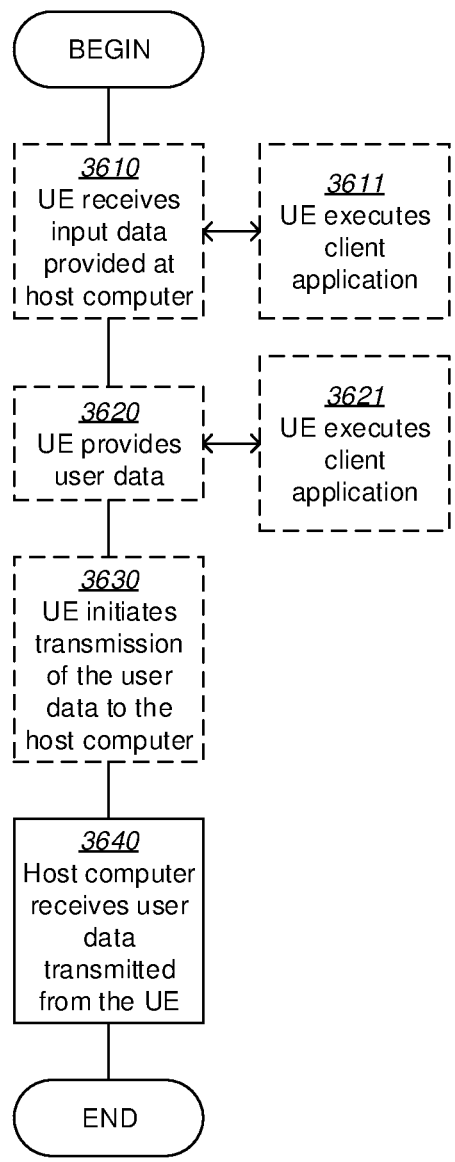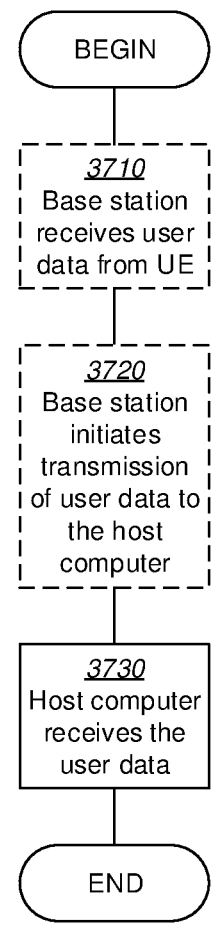
Fig. 13
Fig. 14

METHODS, WIRELESS DEVICE AND NETWORK NODE FOR TRANSMISSION OF UPLINK DATA

CROSS-REFERENCE TO RELATED APPLICATIONS

This application is a National stage of International Application No. PCT/SE2018/051124, filed Nov. 5, 2018, which is hereby incorporated by reference.

TECHNICAL FIELD

The present disclosure relates generally to a method performed by a wireless device and a wireless device for wireless transmission of data to a network node of a wireless communication network. The present disclosure further relates to a method performed by a network node and a network node for controlling uplink transmissions from a wireless device. The present disclosure further relates to computer programs and carriers corresponding to the above methods, devices and nodes.

BACKGROUND

In typical wireless communication networks, such as networks built on Long Term Evolution (LTE) and New Radio (NR), both downlink transmissions, i.e. from network node to wireless device and uplink transmissions, i.e. from wireless device to network node, are usually scheduled dynamically from scheduling unit to scheduling unit. A downlink/uplink scheduler, usually located in a network node of the wireless communication network, such as an eNodeB or gNodeB, in large degree controls the network behavior of data transmissions.

Particularly for uplink transmissions, the scheduler provides each wireless device, also called UE, a scheduling grant comprising the radio resources on which the UE should transmit its data, in e.g. a Physical Uplink Shared Channel (PUSCH) and a corresponding transport format. A scheduling grant is associated with PUSCH transmission for either one Transmission Time Interval (TTI) or for multiple consecutive TTIs, called TTI bundling. The timing for the scheduling grant and for the actual PUSCH transmission could be formulated as n and n+k, where n represents the TTI of the scheduling grant, and n+k represents the TTI for the PUSCH transmission. The offset k is then the time between the scheduling grant and the actual transmission scheduled in the scheduling grant. The offset k is straightforward in Frequency Division Duplex (FDD) but becomes more complicated in Time Division Duplex (TDD) depending on uplink and downlink slot configuration, and carrier aggregation will make it even more intricate. Nevertheless, fundamentally for each PUSCH transmission per carrier, only one scheduling grant is sufficient to provide control information and the offset value k is motivated to be handled in synchronous fashion, i.e. is known on both UE and network side, thus there is no need of Layer 1 signaling for it.

In NR, as a consequence of more flexible and finer control of Hybrid Automatic Repeat Request (HARQ) timing, a dynamic offset value (k) is needed and therefore the offset value k is added into the scheduling grant, as part of L1 signaling, to inform the UE of the offset value k. Each time the UE receives an uplink scheduling grant, it decodes the offset value k and puts it into control of PUSCH timing. This mechanism supplies uplink scheduler leverage to choose best offset value k according to UE's time need to prepare for PUSCH transmission, which primarily depends on UE capability and to how much degree the source data for PUSCH is ready for sending. FIG. 1 shows an example where k=7 is applied for transmission of aperiodic channel state information (A-CSI) on PUSCH, while k=2 is applied for conventional data transmission. The longer time for A-CSI is because A-CSI requires extra time on collecting measurement samples that are to be transmitted at n+k. Also, the UE may need to process the measurement samples before they can be sent. In the text below, such scheduling capable of supporting multiple offset values k for one UE is called multi time-scale scheduling.

For multi time-scale scheduling in general, traffic data on the PUSCH could be classified into different categories. Each data category corresponds to a certain time scale requirement of k. A straightforward scheduling solution will be that different categories of data are scheduled separately and each category is scheduled with its corresponding k value. Each data category could furthermore be associated with certain scheduling priority to facilitate ultimately fulfilling quality of service (QoS) requirements.

One slightly improved method is to allow for cross-category scheduling with the large timescale offset. This is shown in FIG. 2. In this example both A-CSI and data on PUSCH are scheduled with the offset value k=7, which corresponding to the normal A-CSI offset value. Apparently, it is not possible to schedule both A-CSI and data with the small timescale k=2 as this will not leave enough time for the collection of measurement samples needed in A-CSI. With this method, when scheduled with large time-scale data, the small-time scale data is forced to be scheduled with a larger offset than it should have been if transmitted on its own using its own offset.

Further, the amount of data to be scheduled could possibly deviate from the actual buffer size due to early scheduling decision on small-timescale data. As shown in the example of FIG. 3, an uplink scheduling grant is sent from the network node to the UE on time slot 4 (e.g. TTI 4). The scheduling decision was then taken by the network node on slot 2 with the assumption of a 2 slot gap necessary from scheduling to transmission over the air to the UE. A Buffer Status Report (BSR) received on slot 3 will then not be captured into the scheduling for transmission in time slot 11. Consequently, the spectrum might be wasted as the new data reported in on the BSR is not scheduled for transmission in time slot 11, and there may thus be bandwidth in time slot 11 that is not fully utilized.

As a consequence, there is a need of a more efficient scheduling of transmissions in the uplink. Also, there is a need of more efficient resource utilization while maintaining QoS prioritization among different types of data to be sent uplink.

SUMMARY

It is an object of the invention to address at least some of the problems and issues outlined above. It is an object of embodiments of the invention to achieve more efficient scheduling for transmission of different kinds of data from a wireless device to a network node. It is possible to achieve these objects and others by using methods, network nodes and wireless devices as defined in the attached independent claims.

According to one aspect, a method is provided performed by a wireless device for wireless transmission of data to a network node of a wireless communication network. The method comprises receiving, from the network node, at a first time slot, a first scheduling grant instructing the wireless device to transmit first data to the network node at a third time slot; and receiving, from the network node, at a second time slot later than the first time slot but earlier than the third time slot, a second scheduling grant instructing the wireless device to transmit second data to the network node at the third time slot. The method further comprises transmitting, to the network node at the third time slot, the second data, and possibly also the first data, in uplink transmission resources of the third time slot, wherein the transmission is performed in accordance with an instruction.

According to another aspect, a method is provided performed by a network node of a wireless communication network, for controlling uplink transmissions from a wireless device. The method comprises sending, to the wireless device at a first time slot, a first scheduling grant instructing the wireless device to transmit first data to the network node at a third time slot. The method further comprises sending, to the wireless device at a second time slot later than the first time slot but earlier than the third time slot, a second scheduling grant instructing the wireless device to transmit second data to the network node at the third time slot, and receiving, from the wireless device, the second data, and possibly also the first data, in uplink transmission resources of the third time slot.

According to another aspect, a wireless device is provided, configured for wireless transmission of data to a network node of a wireless communication network. The wireless device comprises a processing circuitry and a memory. The memory contains instructions executable by said processing circuitry, whereby the wireless device is operative for receiving, from the network node, at a first time slot, a first scheduling grant instructing the wireless device to transmit first data to the network node at a third time slot. The wireless device is further operative for receiving, from the network node, at a second time slot later than the first time slot but earlier than the third time slot, a second scheduling grant instructing the wireless device to transmit second data to the network node at the third time slot, and for transmitting, to the network node at the third time slot, the second data, and possibly also the first data, in uplink transmission resources of the third time slot, wherein the transmission is performed in accordance with an instruction.

According to another aspect, a network node is provided, operable in a wireless communication network, and configured for controlling uplink transmissions from a wireless device. The network node comprises a processing circuitry and a memory. The memory contains instructions executable by said processing circuitry, whereby the network node is operative for sending, to the wireless device at a first time slot, a first scheduling grant instructing the wireless device to transmit first data to the network node at a third time slot. The network node is further operative for sending, to the wireless device at a second time slot later than the first time slot but earlier than the third time slot, a second scheduling grant instructing the wireless device to transmit second data to the network node at the third time slot, and for receiving, from the wireless device, the second data, and possibly also the first data, in uplink transmission resources of the third time slot.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIGS. 13 to 14 are flowcharts illustrating methods implemented in a communication system including a host computer, a network node and a wireless device.

DETAILED DESCRIPTION

Figure 1:
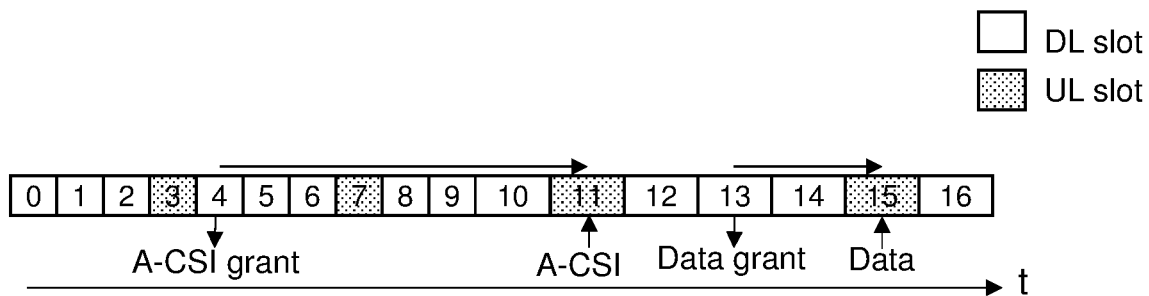
FIGS. 1-3 are diagrams of a sequence of time slots including scheduling grants and transmission of data according to three different prior art teachings.
Figure 2:
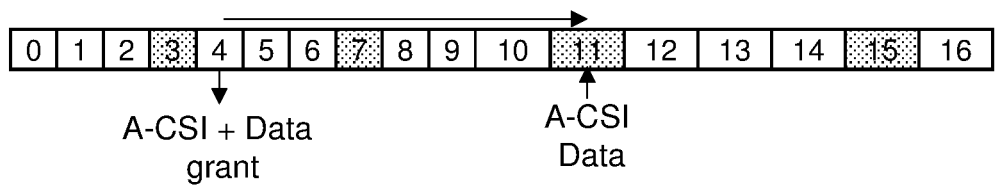
Figure 3:
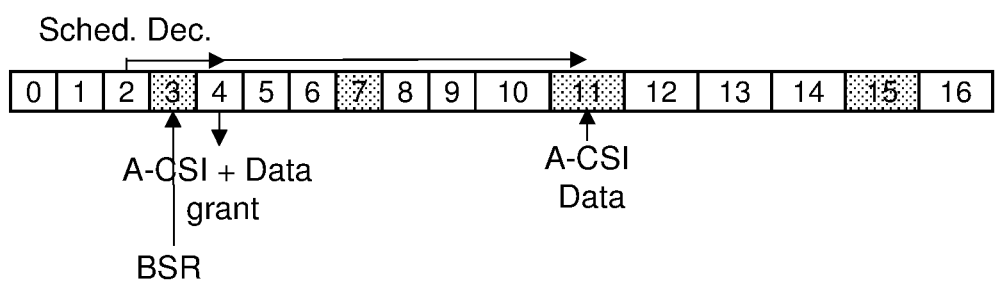
Figure 4:
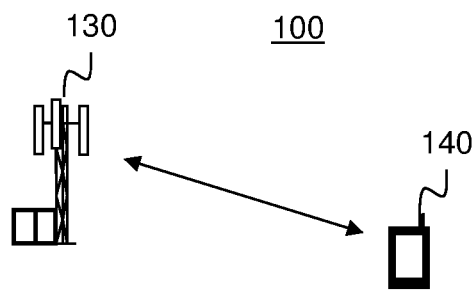
FIG. 4 is a schematic block diagram of a wireless communication scenario in which the present invention may be used.

FIG. 4 shows a wireless communication network 100 comprising a radio access network node 130 that is in, or is adapted for, wireless communication with a wireless communication device 140.

The wireless communication network 100 may be a fifth generation (5G) wireless communication network based on technology such as New Radio (NR), or any other kind of 5G or future wireless communication network that can provide radio access to wireless devices.

The radio access network node 130 may be any kind of network node that is able to provide wireless access to a wireless communication device 140 alone or in combination with another network node. Examples of radio access network nodes 130 are a base station (BS), an evolved Node B (eNB), a next generation NodeB (gNB), a remote radio unit (RRU), a remote radio head (RRH), etc. In the following, the radio access network node is called "network node".

The wireless communication device 140 may be any type of device capable of wirelessly communicating with a network node 130 using radio signals. For example, the wireless communication device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE), an Internet of Things (IoT) device etc. In the following, the wireless communication device is called "wireless device".

Figure 5:
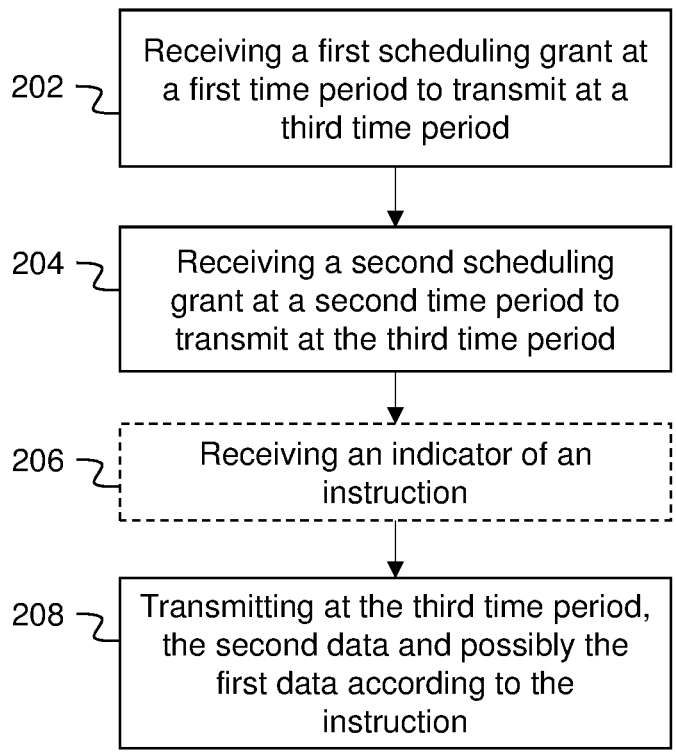
FIG. 5 is a flow chart illustrating a method performed by a wireless device, according to possible embodiments.

FIG. 5, in conjunction with FIG. 4, illustrates a method according to embodiments, performed by a wireless device 140 for wireless transmission of data to a network node 130 of a wireless communication network 100. The method comprises receiving 202, from the network node 130, at a first time slot, a first scheduling grant instructing the wireless device 140 to transmit first data to the network node 130 at a third time slot; and receiving 204, from the network node 130, at a second time slot later than the first time slot but earlier than the third time slot, a second scheduling grant instructing the wireless device 140 to transmit second data to the network node at the third time slot. The method further comprises transmitting 208, to the network node 130 at the third time slot, the second data, and possibly also the first data, in uplink transmission resources of the third time slot, wherein the transmission is performed in accordance with an instruction.

The wireless communication network could be e.g. an LTE- or NR-based communication network. In case the wireless device is equipped with multiple identifiers, the first and second scheduling grant as well as the transmitting at the third time slot relates to the same identifier of the wireless device. A "time slot" is a timing unit of a communication protocol used in the wireless communication network. The term "time slot" could here be any time unit for scheduling, such as a whole time slot or a fraction of a time slot, i.e. a symbol time of one or more symbols of a time slot or a mini slot, i.e. a small number of symbols, or even a whole subframe in LTE. The first data may e.g. be a report of measurements to be performed by the wireless device, e.g. an A-CSI measurement report. The second data may be regular traffic data. The instruction could be pre-stored at the wireless device or communicated by the network node when the communication device starts communicating with the node, or the instruction could be received as an indicator together with the second grant, etc. The instruction may specify the relation between the first scheduling grant and the second scheduling grant.

By such a method it is possible to add information in a second scheduling grant of second data to be sent uplink, the second scheduling grant being sent after the first scheduling grant. This second data can then be transmitted uplink together with the first data scheduled in the first scheduling grant, or instead of the first data. Such add-on or replacement is not possible today. As a result, the scheduling becomes more flexible and therefore the sending of data in uplink can be more efficient so that the uplink communication resources can be used more efficiently, hereby increasing data throughput and reducing latency for uplink communication.

According to an embodiment, the instruction implies that the wireless device 140 transmits 208 the first data and the second data using one and the same HARQ process. The first data and the second data may be transmitted on different PRBs or in the same PRBs. By sending both the first and second data in this way using the same HARQ process means that wireless device power will be saved compared to having to send the first and second data in two different time slots with two different HARQ processes as would have been the case if data could not have been added on to the transmission in the third time slot.

According to another embodiment, the instruction implies that the wireless device 140 transmits 208 only the second data in the third time slot. In other words, the second scheduling grant overrides the first scheduling grant. Hereby, it is possible to replace instructions sent in the first grant with new instructions. This results in that either the first data is rescheduled as part of the second data, or if the first data for some reason is not of interest to send anymore, it is not sent unnecessary, but the time slot can still be used by sending the second data. As a consequence, the uplink transmission becomes more efficient.

According to another embodiment, the instruction implies that the wireless device 140 transmits 208 the first data using a first HARQ process and the second data using a second HARQ process different from the first HARQ process. This use case is mainly of interest in MIMO spatial-multiplexing where the first data and the second data are for beneficially scheduled on different layers. By such a method, wireless device and network node saves processing power, as the scheduling decision in the first grant is still valid for the actual transmission. In other words, no rescheduling is necessary for the sending of the first data even though the second data is added in the second scheduling grant.

According to another embodiment, the method further comprises: receiving 206, from the network node 130, an indicator of the instruction. The indicator may be the actual instruction or it may be a pointer comprising a few bits that refer to a list of possible instructions stored at the wireless device. By receiving an indicator of the instruction from the network node, the network node has the ability to give different instructions for different devices and different occurrences, thereby giving a lot of flexibility to the scheduling grants. By sending a pointer comprising only a few bits, referring to a list of possible already stored instructions, the amount of data to be sent for sending an instruction is minimized, thereby sparing communication resources.

According to a variant of this embodiment, the indicator is received 206 together with the second scheduling grant. Hereby it is possible for the network node to give late instructions to the communication device. Also, an already sent message, the second scheduling grant, is used for appending the instructions, which is an efficient usage of communication resources.

Figure 6:
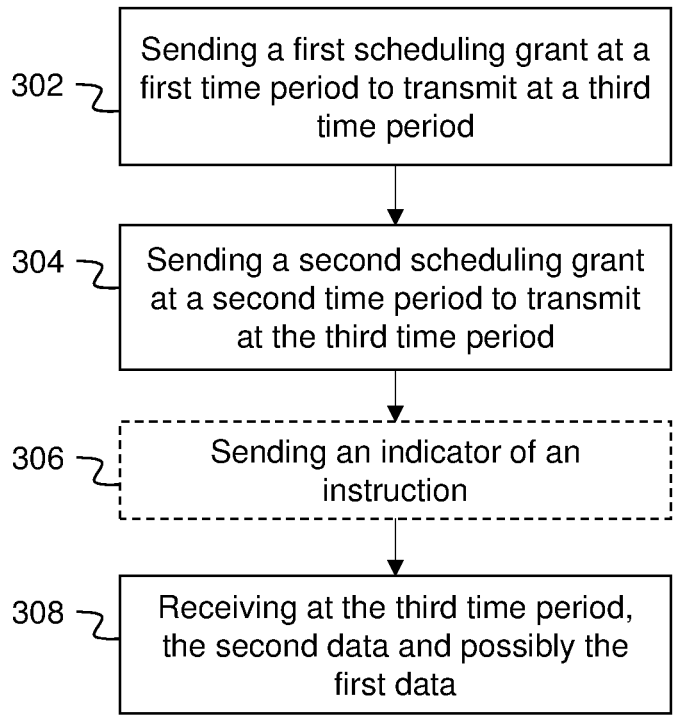
FIG. 6 is a flow chart illustrating a method performed by a network node, according to possible embodiments.

FIG. 6, in conjunction with FIG. 4, illustrates an embodiment of a method performed by a network node 130 of a wireless communication network 100, for controlling uplink transmissions from a wireless device 140. The method comprises sending 302, to the wireless device 140 at a first time slot, a first scheduling grant instructing the wireless device 140 to transmit first data to the network node 130 at a third time slot. The method further comprises sending 304, to the wireless device 140 at a second time slot later than the first time slot but earlier than the third time slot, a second scheduling grant instructing the wireless device 140 to transmit second data to the network node at the third time slot, and receiving 308, from the wireless device 140, the second data, and possibly also the first data, in uplink transmission resources of the third time slot.

Hereby, the network node 130 can send a second scheduling grant to the wireless device for transmitting in a third time slot as an add-on to an earlier sent scheduling grant that it has sent to the wireless device.

According to an embodiment, the receiving 308 implies receiving the first data as well as the second data in the third time slot.

According to another embodiment, the receiving 308 implies receiving only the second data in the third time slot.

According to another embodiment, the method further comprises sending 306, to the wireless device 140, an indicator of an instruction to the wireless device how to handle the first scheduling grant and the second scheduling grant.

According to a variant of this embodiment, the indicator is sent 306 together with the second scheduling grant.

Figure 7:
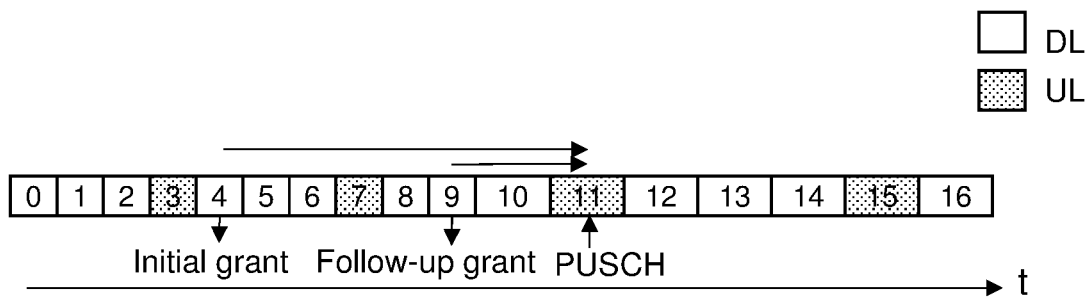
FIG. 7 is a diagram of a sequence of time slots including scheduling grants and transmission of data according to a possible embodiment.
Figure 8:
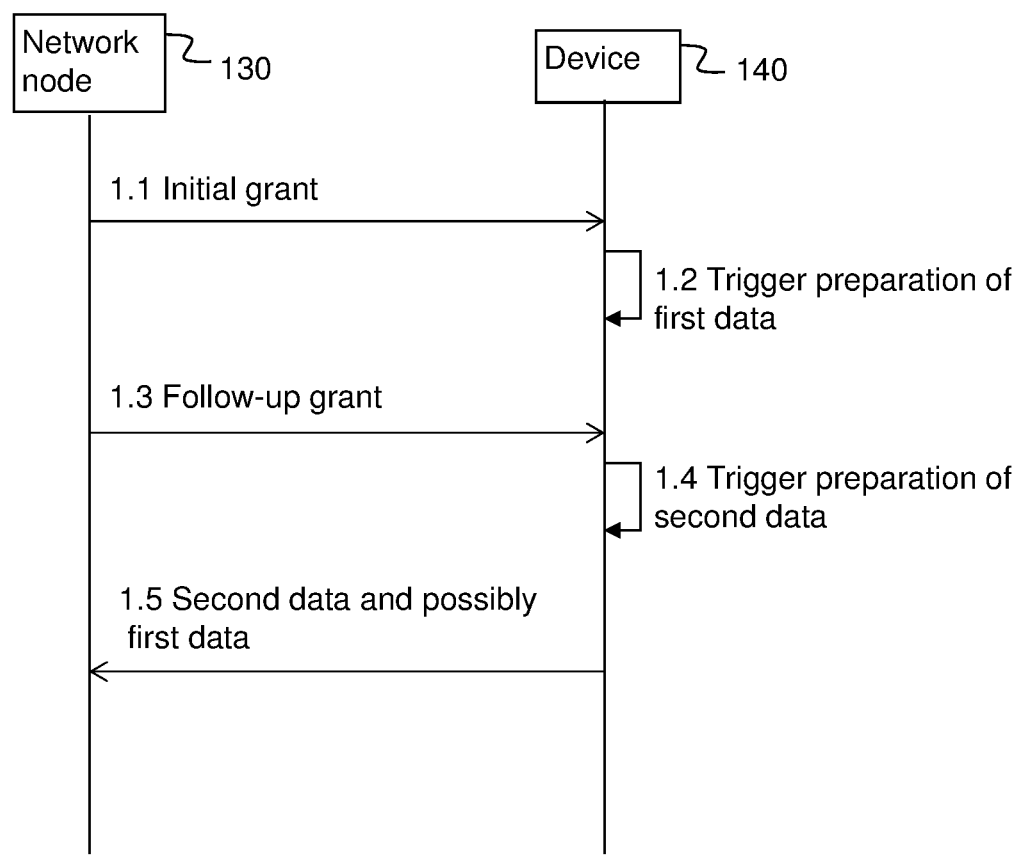
FIG. 8 is a signaling diagram illustrating an example of a method performed by the involved network node and wireless device, according to further possible embodiments.

FIGS. 7 and 8 illustrate an embodiment for scheduling transmission of large-timescale data, e.g. A-CSI, and/or small-timescale data, e.g. data, based on a combination of multiple scheduling grants, each of which corresponds to different time-scale scheduling. At a first step 1.1, a first scheduling grant, aka initial grant, is sent by the network node 130 to the wireless device 140. In the time-scale example of FIG. 7, the initial grant is sent in time slot 4, and it is a large-time scale scheduling time slot having a large time offset of 7 time slots. In other words, the actual sending of data scheduled by the initial grant takes place in time slot 11, 7 time slots after the sending of the initial grant. The payload data, called first data, granted by the initial grant could be either large-timescale or small-timescale data. When the wireless device 140 receives the initial grant, the wireless device triggers 1.2 preparation of the first data that is to be sent in the time slot that the initial grant refers to, i.e. time slot 11 in the example of FIG. 7. The preparation may be performing A-CSI measurements.

At a second time point, in FIG. 7 in time slot 9, the network node 130 sends 1.3 a second scheduling grant, aka follow-up grant, to the wireless device 140. The sending 1.3 of the follow-up grant may be triggered based on e.g. an updated buffer size estimation and/or an updated channel status. The network node 130 estimates the buffer size of the wireless device 140 based on buffer status reports that it receives from the wireless device. The follow-up grant is a small-timescale scheduling having an offset of 2 time slots, meaning that second data triggered to be sent by the follow-up grant is to be sent in time slot 11. The second data need to be small-timescale data in order to be able to be sent already in time slot 11.

There are different possible use cases for the sending of the follow-up grant and for how the wireless device is to handle the initial grant and the follow-up grant. In a first case, which is called "joint", the wireless device has received, or receives, an instruction to perform one transmission based on the initial grant and the follow-up grant. In a second case, called "override", the instruction is for the wireless device to perform one transmission based solely on the follow-up grant. In a third case, called "independent", the instruction is for the wireless device to perform a first transmission based on the initial grant and a second transmission based on the follow-up grant at the same time slot but using different HARQ processes. The instruction for the wireless device which use case to perform may be pre-stored or it may be sent by the network node 130 to the wireless device 140 as an indicator, e.g. together with the sending of the follow-up grant.

In a first example of the "joint" case, an A-CSI request (or similar type) was scheduled in the initial grant. Then the scheduler of the network node 130 issues a follow-up grant to add more data into the same transmission based on e.g. an updated buffer status report. In a second example of the "joint" case, the scheduler of the network node issues a follow-up grant with a Physical Resource Block (PRB) allocation adjacent to PRBs allocated in the initial grant, and with a same Modulation and Coding Scheme (MCS) as in the initial grant. Hereby, the scheduler does not need to redo scheduling and link adaptation for the allocation of the initial grant. In a third example of the "joint" case, the follow-up grant is issued using different symbols, with or without different MCS and with or without the same PRBs as the initial grant. The scheduling decision of the initial grant in a different symbol is not affected.

In an example of the "override" case, the follow-up grant is issued by the network node with PRBs not adjacent to those allocated in the initial grant. In an example of the "independent" case, the follow-up grant is issued on a different layer with a different HARQ process identification than in the initial grant. This is applicable when multiple layer transmissions are possible and there are no communication resources, i.e. frequency and time resources, available in the layer allocated in the initial grant. The "independent" case can also be used when the wireless device 140 is instructed to transmit on the same layer but in a different PRB with different antennas.

Going back to FIG. 8, at reception of the follow-up grant 1.3, the wireless device triggers 1.4 preparation of the first data to be sent at the third time slot, i.e. time a lot 11 in the example of FIG. 7. For example, if A-CSI is granted and the instruction is "joint", the A-CSI measurements triggered by the initial grant continues.

At the third time slot, according to the initial grant and the follow-up grant, a transmission 1.5 of the second data and possibly also the first data is performed uplink from the wireless device 140 to the network node 130, according to the instructions. For the instruction case "joint", the first example, the uplink transmission 1.5 is based on the follow-up grant, but payload data of e.g. the A-CSI, is the measurement result triggered by the initial grant. For the instruction case "joint", the second example, the uplink transmission 1.5 is based on the initial grant as well as on the follow-up grant, and the PRB allocations are aggregated from both grants. For the instruction case "joint", the third example, the uplink transmission 1.5 comprises two sets of time symbols, the first set corresponding to the initial grant and the second set corresponding to the follow-up grant. For the instruction case "override", the wireless device 140 discards the initial grant and transmits 1.5 according to the follow-up grant on the same HARQ process as should have been used according to the initial grant. For the instructions case "independent", the wireless device 140 performs two transmissions in the same time slot independently using different HARQ processes, based on the initial grant and on the follow-up grant. The wireless device transmits 1.5 the first data (of the initial grant) on a first layer with a first HARQ process and transmits the second data (of the follow-up grant) on a second layer with a second HARQ process, different from the first layer and the first HARQ process, based on a MCS and PRB allocation specified in the respective initial grant and follow-up grant.

The indicator of the instruction that according to an embodiment is sent from the network node 130 to the wireless device 140 can be carried by for example a Layer 1 message in a Downlink Control Information (DCI), or by a Layer 2 message as a special MAC control indicator, or by a Layer 3 message such as Radio Resource Control (RRC) signaling. As mentioned, the instruction may also be defined as a rule applied for the transmissions involved with a special data. For example, a rule may be defined that if the first grant is an A-CSI report grant, and when a second grant is received at the UE, the UE will use the second grant combined with the A-CSI measurement report.

The grant combination relations described according to the cases "joint", "override" and "independent" above are non-limiting example cases. Instead, the grant combination relations can be applied for any scheduling use case that supports multiple scheduling response times.

Figure 9:
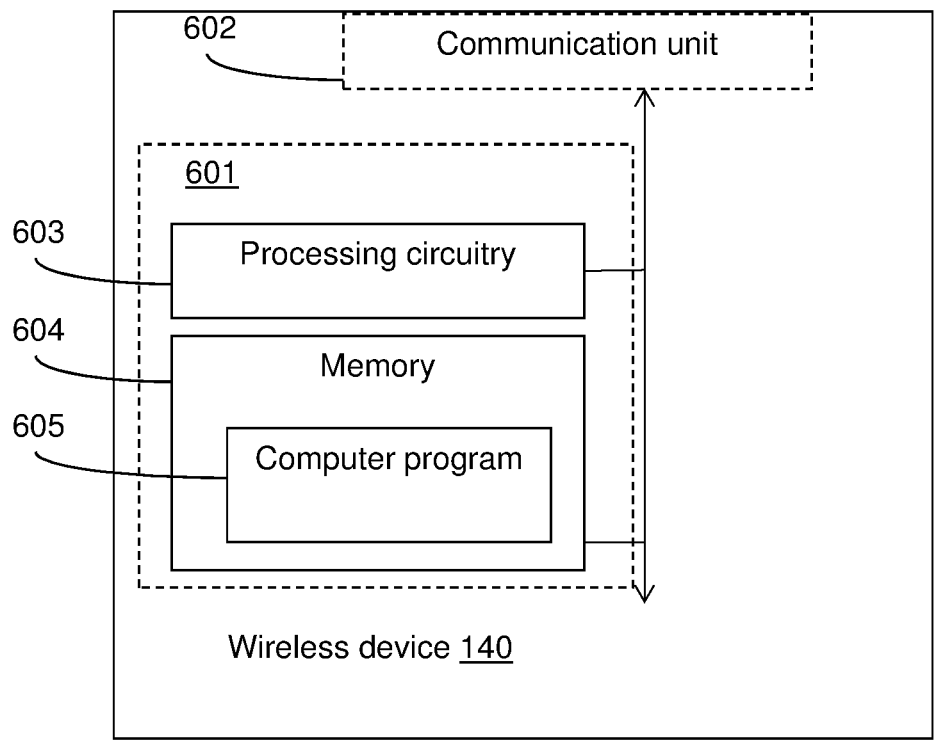
FIG. 9 is a block diagram illustrating a wireless device in more detail, according to further possible embodiments.

FIG. 9, in conjunction with FIG. 4, describes a wireless device 140 configured for wireless transmission of data to a network node 130 of a wireless communication network 100. The wireless device 140 comprises a processing circuitry 603 and a memory 604. The memory contains instructions executable by said processing circuitry, whereby the wireless device 140 is operative for receiving, from the network node 130, at a first time slot, a first scheduling grant instructing the wireless device 140 to transmit first data to the network node 130 at a third time slot. The wireless device is further operative for receiving, from the network node 130, at a second time slot later than the first time slot but earlier than the third time slot, a second scheduling grant instructing the wireless device 140 to transmit second data to the network node at the third time slot, and for transmitting, to the network node 130 at the third time slot, the second data, and possibly also the first data, in uplink transmission resources of the third time slot, wherein the transmission is performed in accordance with an instruction.

According to an embodiment, the instruction implies that the wireless device 140 is to transmit the first data and the second data using one and the same HARQ process.

According to another embodiment, the instruction implies that the wireless device 140 is to transmit only the second data in the third time slot.

According to another embodiment, the instruction implies that the wireless device 140 is to transmit the first data using a first HARQ process and the second data using a second HARQ process different from the first HARQ process.

According to yet another embodiment, the wireless device 140 is further operative for receiving, from the network node 130, an indicator of the instruction. According to an alternative of this embodiment, the wireless device 140 is operative for receiving the indicator together with the second scheduling grant.

According to other embodiments, the wireless device 140 may further comprise a communication unit 602, which may be considered to comprise conventional means for wireless communication with the network node 130, such as a transceiver for wireless transmission and reception of the wireless communication with the network node 130. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the wireless device 140 to perform the steps described in any of the described embodiments of the wireless device 140 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the wireless device 140 has access via the communication unit 602. The computer program 605 may then be downloaded from the server into the memory 604.

Figure 10:
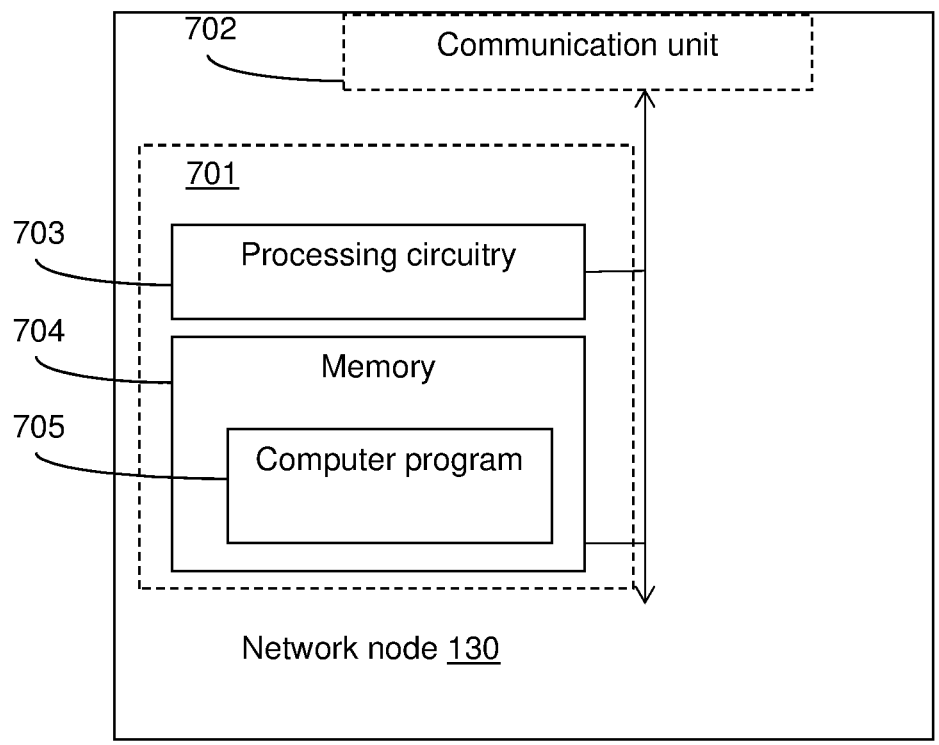
FIG. 10 is a block diagram illustrating a network node in more detail, according to further possible embodiments.

FIG. 10, in conjunction with FIG. 4, describes a network node 130 operable in a wireless communication network 100, and configured for controlling uplink transmissions from a wireless device 140. The network node 130 comprises a processing circuitry 703 and a memory 704. The memory contains instructions executable by said processing circuitry, whereby the network node 130 is operative for sending, to the wireless device 140 at a first time slot, a first scheduling grant instructing the wireless device 140 to transmit first data to the network node 130 at a third time slot. The network node is further operative for sending, to the wireless device 140 at a second time slot later than the first time slot but earlier than the third time slot, a second scheduling grant instructing the wireless device 140 to transmit second data to the network node at the third time slot, and for receiving, from the wireless device 140, the second data, and possibly also the first data, in uplink transmission resources of the third time slot.

According to an embodiment, the network node 130 is operative for the receiving by receiving the first data as well as the second data in the third time slot.

According to another embodiment, the network node 130 is operative for the receiving by receiving only the second data in the third time slot.

According to another embodiment, the network node 130 is further operative for sending, to the wireless device 140, an indicator of an instruction to the wireless device how to handle the first scheduling grant and the second scheduling grant. According to an alternative of this embodiment, the network node 130 is operative for sending the indicator together with the second scheduling grant.

According to other embodiments, the network node 130 may further comprise a communication unit 702, which may be considered to comprise conventional means for wireless communication with the wireless device 140, such as a transceiver for wireless transmission and reception. The communication unit 702 may also comprise conventional means for communication with other network nodes of the wireless communication network 100. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the network node 130 to perform the steps described in any of the described embodiments of the network node 130 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the network node 130 has access via the communication unit 702. The computer program 705 may then be downloaded from the server into the memory 704.

Figure 11:
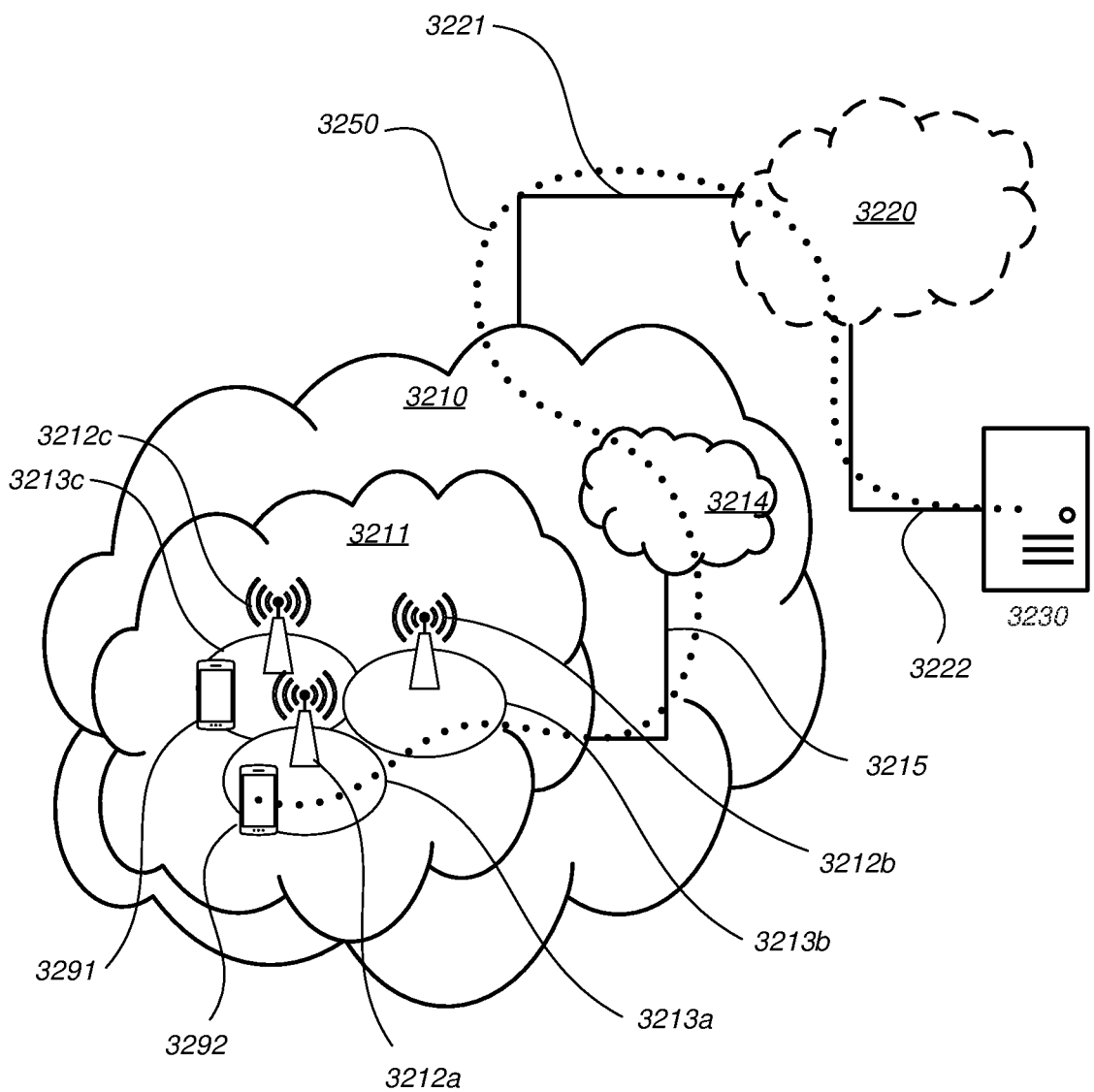
FIG. 11 schematically illustrates a telecommunication network connected via an intermediate network to a host computer.

With reference to FIG. 11 in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
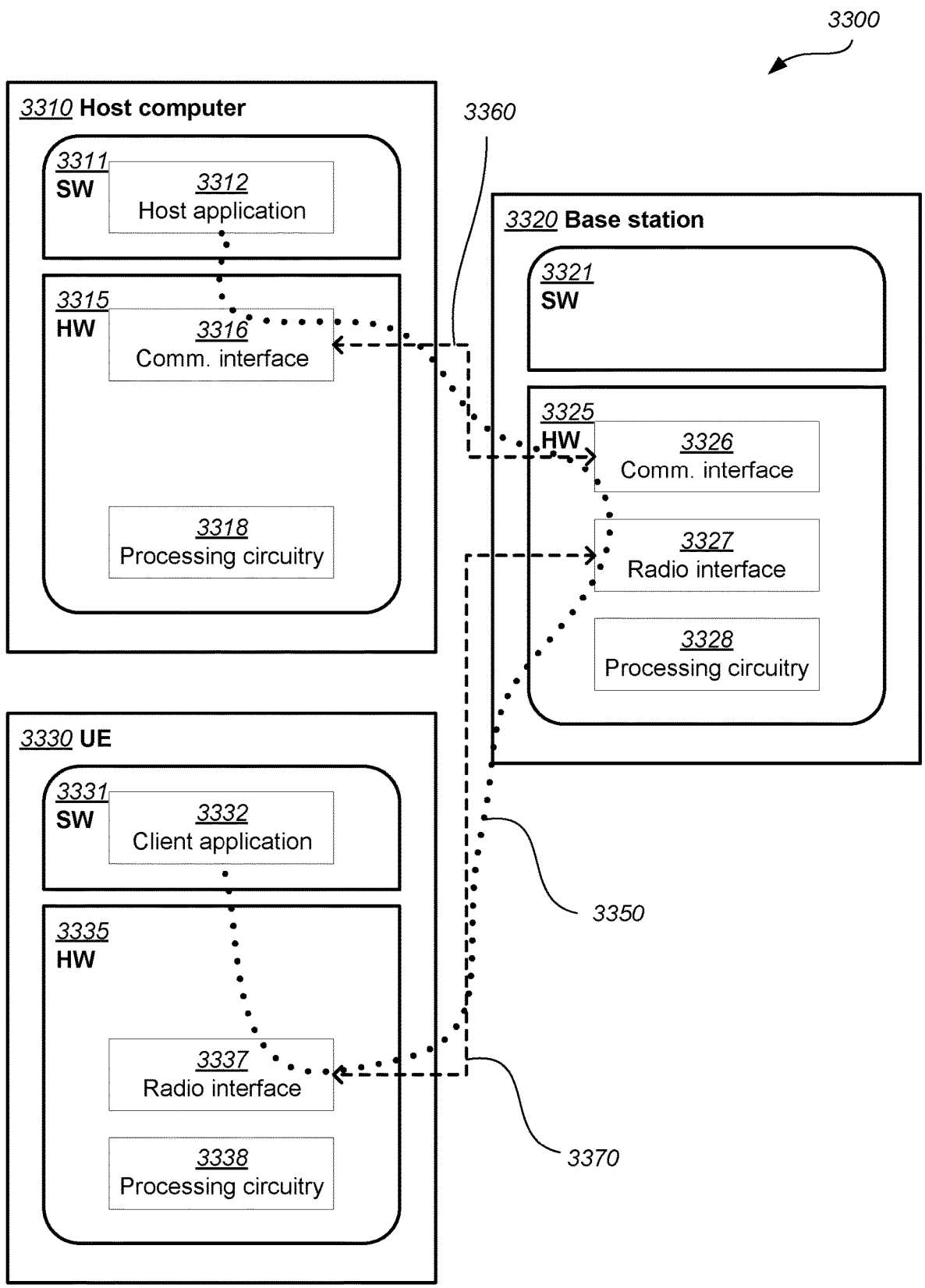
FIG. 12 is a generalized block diagram of a host computer communicating via a network node with a wireless device over a partially wireless connection.

It is noted that the host computer 3310, base station 3320 and UE 3330 illustrated in FIG. 12 may be identical to the host computer 3230, one of the base stations 3212*a*, 3212*b*, 3212*c* and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and latency for sending data uplink, and thereby provide benefits such as relaxed restriction on file size and better responsiveness A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

In the following numbered embodiments, the wording "base station" is equivalent to the wording "network node" used in other parts of this application text, such as in the claims. Further, the wording "UE" is equivalent to the wording "wireless device" used in other parts of this application text, such as in the claims.

Numbered Embodiments

41. A user equipment (UE) configured to communicate with a base station, the UE comprising a radio interface and processing circuitry configured for receiving, from the base station, at a first time slot, a first scheduling grant instructing the UE to transmit first data to the base station at a third time slot;

receiving, from the base station, at a second time slot later than the first time slot but earlier than the third time slot, a second scheduling grant instructing the UE to transmit second data to the base station at the third time slot, and transmitting, to the base station at the third time slot, the second data, and possibly also the first data, in uplink transmission resources of the third time slot, wherein the transmission is performed in accordance with an instruction.

45. A communication system including a host computer comprising:

a communication interface configured to receive user data originating from a transmission from a user equipment (UE) to a base station, wherein the UE comprises a radio interface and processing circuitry, the UE's processing circuitry configured for:

receiving, from the base station, at a first time slot, a first scheduling grant instructing the UE to transmit first data to the base station at a third time slot;

receiving, from the base station, at a second time slot later than the first time slot but earlier than the third time slot, a second scheduling grant instructing the UE to transmit second data to the base station at the third time slot, and transmitting, to the base station at the third time slot, the second data, and possibly also the first data, in uplink transmission resources of the third time slot, wherein the transmission is performed in accordance with an instruction.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising:
receiving, from the base station, at a first time slot, a first scheduling grant instructing the UE to transmit first data to the base station at a third time slot;
receiving, from the base station, at a second time slot later than the first time slot but earlier than the third time slot, a second scheduling grant instructing the UE to transmit second data to the base station at the third time slot, and
transmitting, to the base station at the third time slot, the second data, and possibly also the first data, in uplink transmission resources of the third time slot, wherein the transmission is performed in accordance with an instruction.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE:
receives, from the base station, at a first time slot, a first scheduling grant instructing the UE to transmit first data to the base station at a third time slot;
receives, from the base station, at a second time slot later than the first time slot but earlier than the third time slot, a second scheduling grant instructing the UE to transmit second data to the base station at the third time slot, and
transmits, to the base station at the third time slot, the second data, and possibly also the first data, in uplink transmission resources of the third time slot, wherein the transmission is performed in accordance with an instruction.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured for:
sending, to the UE at a first time slot, a first scheduling grant instructing the UE to transmit first data to the base station at a third time slot,
sending, to the UE at a second time slot later than the first time slot but earlier than the third time slot, a second scheduling grant instructing the UE to transmit second data to the base station at the third time slot, and
receiving, from the UE, the second data, and possibly also the first data, in uplink transmission resources of the third time slot.

65. A communication system including a host computer comprising a communication interface configured to receive user data originating from a transmission from a user equipment (UE) to a base station, wherein the base station comprises a radio interface and processing circuitry, the base station's processing circuitry configured for:
sending, to the UE at a first time slot, a first scheduling grant instructing the UE to transmit first data to the base station at a third time slot,
sending, to the UE at a second time slot later than the first time slot but earlier than the third time slot, a second scheduling grant instructing the UE to transmit second data to the base station at the third time slot, and
receiving, from the UE, the second data, and possibly also the first data, in uplink transmission resources of the third time slot.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising:
sending, to the UE at a first time slot, a first scheduling grant instructing the UE to transmit first data to the base station at a third time slot,
sending, to the UE at a second time slot later than the first time slot but earlier than the third time slot, a second scheduling grant instructing the UE to transmit second data to the base station at the third time slot, and receiving, from the UE, the second data, and possibly also the first data, in uplink transmission resources of the third time slot.

75. A method implemented in a communication system including a host computer, a base station and a user equipment (UE), the method comprising:

at the host computer, receiving, from the base station, user data originating from a transmission which the base station has received from the UE, wherein the base station:

sends, to the UE at a first time slot, a first scheduling grant instructing the UE to transmit first data to the base station at a third time slot, sends, to the UE at a second time slot later than the first time slot but earlier than the third time slot, a second scheduling grant instructing the UE to transmit second data to the base station at the third time slot, and receives, from the UE, the second data, and possibly also the first data, in uplink transmission resources of the third time slot.

76. The method of embodiment 75, further comprising:

at the base station, receiving the user data from the UE.

77. The method of embodiment 76, further comprising:

at the base station, initiating a transmission of the received user data to the host computer.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a wireless device for wireless transmission of data to a network node of a wireless communication network, the method comprising:

receiving, from the network node, at a first time slot, a first scheduling grant instructing the wireless device to transmit first data to the network node at a third time slot;

receiving, from the network node, at a second time slot later than the first time slot but earlier than the third time slot, a second scheduling grant instructing the wireless device to transmit second data to the network node at the third time slot; and transmitting, to the network node at the third time slot, the first data and the second data in uplink transmission resources of the third time slot, wherein the transmitting is performed in accordance with an instruction.

2. The method according to claim 1, wherein the instruction implies that the wireless device transmits the first data and the second data using a same Hybrid Automatic Repeat Request (HARQ) process.

3. The method according to claim 1, wherein the instruction implies that the wireless device transmits the first data using a first HARQ process and the second data using a second HARQ process different from the first HARQ process.

4. The method according to claim 1, further comprising:

receiving, from the network node, an indicator of the instruction.

5. The method according to claim 4, wherein the indicator is received together with the second scheduling grant.

6. A method performed by a network node of a wireless communication network, for controlling uplink transmissions from a wireless device, the method comprising:

sending, to the wireless device at a first time slot, a first scheduling grant instructing the wireless device to transmit first data to the network node at a third time slot;

sending, to the wireless device at a second time slot later than the first time slot but earlier than the third time slot, a second scheduling grant instructing the wireless device to transmit second data to the network node at the third time slot; and receiving, from the wireless device, the first data and the second data in uplink transmission resources of the third time slot.

7. The method according to claim 6, further comprising:

sending, to the wireless device, an indicator of an instruction to the wireless device how to handle the first scheduling grant and the second scheduling grant.

8. The method according to claim 7, wherein the indicator is sent together with the second scheduling grant.

9. A wireless device configured for wireless transmission of data to a network node of a wireless communication network, the wireless device comprising:

a processing circuitry; and a memory, said memory containing instructions which, when executed by said processing circuitry, cause the wireless device to:

receive, from the network node, at a first time slot, a first scheduling grant instructing the wireless device to transmit first data to the network node at a third time slot;

receive, from the network node, at a second time slot later than the first time slot but earlier than the third time slot, a second scheduling grant instructing the wireless device to transmit second data to the network node at the third time slot; and transmit, to the network node at the third time slot, the first data and the second data in uplink transmission resources of the third time slot, wherein to transmit is performed in accordance with an instruction.

10. The wireless device according to claim 9, wherein the instruction implies that the wireless device is to transmit the first data and the second data using a same Hybrid Automatic Repeat Request (HARQ) process.

11. The wireless device according to claim 9, wherein the instruction implies that the wireless device is to transmit the first data using a first HARQ process and the second data using a second HARQ process different from the first HARQ process.

12. The wireless device according to claim 9 further to receive, from the network node, an indicator of the instruction.

13. The wireless device according to claim 12 further to receive the indicator together with the second scheduling grant.

14. A network node in a wireless communication network for controlling uplink transmissions from a wireless device, the network node comprising:
- a processing circuitry; and
- a memory, said memory containing instructions which, when executed by said processing circuitry, cause the network node to:
  - send, to the wireless device at a first time slot, a first scheduling grant instructing the wireless device to transmit first data to the network node at a third time slot:
  - send, to the wireless device at a second time slot later than the first time slot but earlier than the third time slot, a second scheduling grant instructing the wireless device to transmit second data to the network node at the third time slot; and
  - receive, from the wireless device, the first data and the second data in uplink transmission resources of the third time slot.

15. The network node according to claim 14 further to send, to the wireless device, an indicator of an instruction to the wireless device how to handle the first scheduling grant and the second scheduling grant.

16. The network node according to claim 15 to send the indicator together with the second scheduling grant.

* * * * *